(12) United States Patent
Bellehumeur

(10) Patent No.: US 6,735,901 B1
(45) Date of Patent: May 18, 2004

(54) ANT REPELLENT STAND

(76) Inventor: Alex R. Bellehumeur, 6242 Napoli Ct., Long Beach, CA (US) 90803

(*) Notice: Subject to any disclaimer, the term of this patent is extended or adjusted under 35 U.S.C. 154(b) by 0 days.

(21) Appl. No.: 10/345,448

(22) Filed: Jan. 17, 2003

(51) Int. Cl.[7] .............................. A01M 1/00; A01M 1/24
(52) U.S. Cl. ......................... 43/132.1; 43/109; 119/61
(58) Field of Search ....................... 43/107, 109, 132.1, 43/131; 119/61; 248/346.11, 346.01, 188, 188.1, 188.2; 52/101

(56) References Cited

U.S. PATENT DOCUMENTS

| | | | | | |
|---|---|---|---|---|---|
| 1,068,258 | A | * | 7/1913 | McCombs | 43/109 |
| 1,305,553 | A | * | 6/1919 | Kruse | 43/109 |
| 1,325,316 | A | * | 12/1919 | Diss | 43/109 |
| 1,405,822 | A | * | 2/1922 | Erickson | 43/109 |
| 1,800,613 | A | * | 4/1931 | Farrell | 43/109 |
| 3,126,666 | A | * | 3/1964 | Petersen | 248/346.11 |
| 3,441,003 | A | * | 4/1969 | Du Mond et al. | 119/61 |
| 4,051,786 | A | * | 10/1977 | Nordgren | 248/188 |
| 4,802,302 | A | * | 2/1989 | Alnafissa | 119/61 |
| 4,803,954 | A | * | 2/1989 | Welch et al. | 119/61 |
| 4,949,678 | A | * | 8/1990 | Demko | 119/61 |
| 4,953,506 | A | | 9/1990 | Sanders | 119/61 |
| 5,109,800 | A | * | 5/1992 | Williams | 119/61 |
| 5,148,626 | A | | 9/1992 | Haake, Sr. | 43/121 |
| 5,176,465 | A | * | 1/1993 | Holsted | 248/346.01 |
| 5,285,749 | A | | 2/1994 | Byer | 119/61 |
| 5,619,952 | A | * | 4/1997 | Walker | 119/61 |
| 5,855,185 | A | * | 1/1999 | Scott | 119/61 |
| 5,881,671 | A | * | 3/1999 | Riedl | 119/61 |
| 5,996,531 | A | | 12/1999 | Anderson | 119/61 |
| 6,065,428 | A | | 5/2000 | Fronk | 119/61 |
| 6,378,242 | B1 | * | 4/2002 | Roberts | 43/109 |
| 6,513,280 | B2 | * | 2/2003 | Roberts | 43/109 |
| 6,581,541 | B2 | * | 6/2003 | Hollinger | 119/61 |

* cited by examiner

Primary Examiner—Darren W. Ark
(74) Attorney, Agent, or Firm—Edgar W. Averill, Jr.

(57) ABSTRACT

An ant repellent stand for attaching to the underside of a container, such as a dog dish which would hold dog food, which would otherwise attract ants. The stand is made up of at least three feet which are adhered to the underside of the container which holds the ant attracting substance. The feet are made with a downwardly facing cavity into which may be snapped a ring or substance, such as cotton, pressed into position containing an ant repelling substance. A foot extends through the ring downwardly onto the floor.

10 Claims, 3 Drawing Sheets

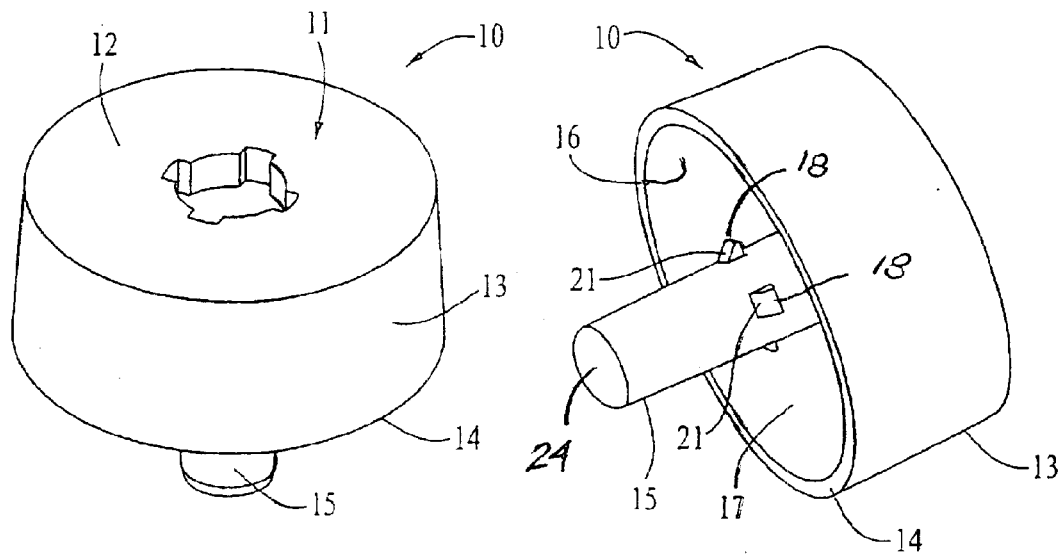
fig.1
fig.2
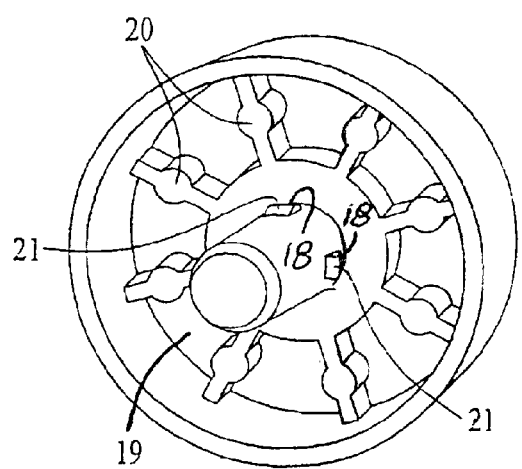
fig.3
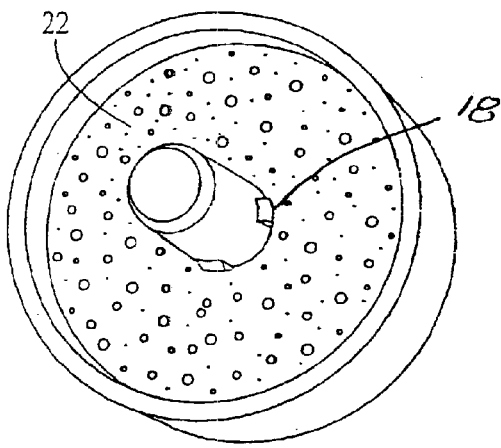
fig.4

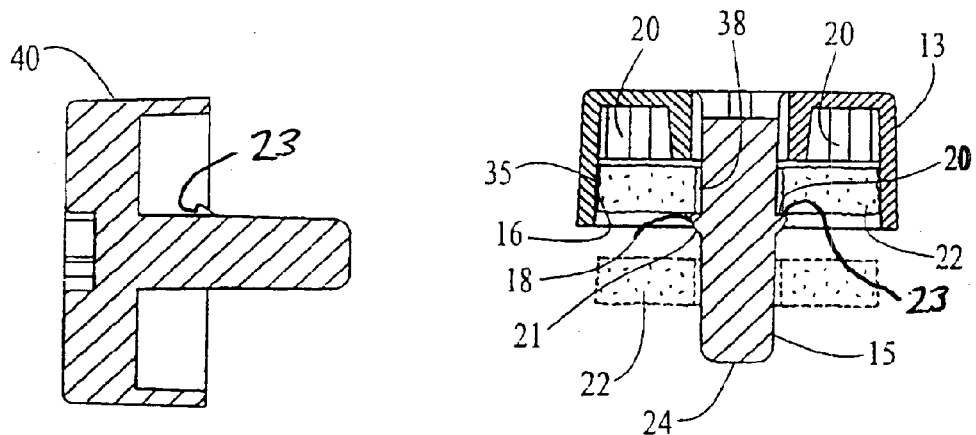
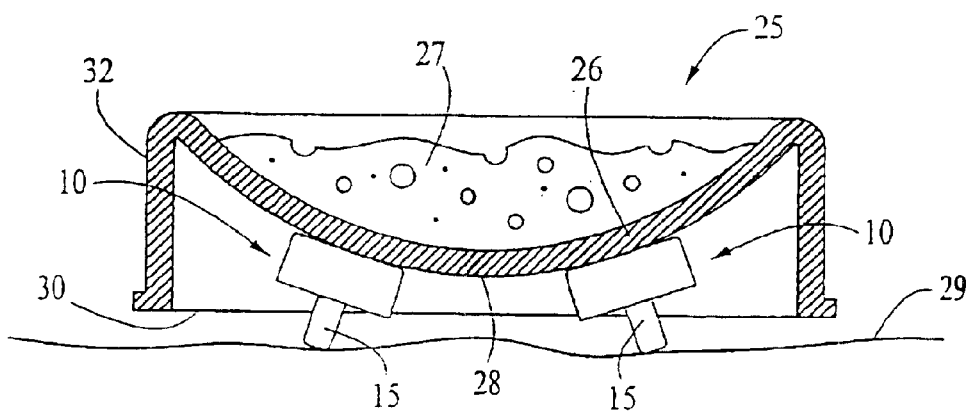

ANT REPELLENT STAND

BACKGROUND OF THE INVENTION

The field of the invention is ant (or other crawling insect) repelling containers and the invention relates more particularly to a means for supporting a conventional container with feet which may be secured to an underside of the container and/or platform, such as a tray.

Numerous attempts have been made to help prevent crawling insects from infesting the contents of a container. Perhaps the most common need for such repellents would be for a pet food dish. Such dishes are commonly kept out of doors where ants are often present. One such approach is shown in the Anderson patent. U.S. Pat. No. 5,996,531. This device provides a container resting on a frame, which has support legs. Each of the support legs has a moat cup. A fluid is placed in the moat cup and provides a barrier to the passage of crawling insects. The filling of the moat cups would be a tedious step and in the event the frame is knocked over, the cups would become empty and require refilling.

Another approach is shown in U.S. Pat. No. 5,148,626 to Haake, Sr. This device is an insect barrier. It utilizes a spongy member disposed under a protective cover or under a peripheral ring surrounding a dish. This device requires a specially made dish to support a center post or the peripheral ring.

The Byer patent U.S. Pat. No. 5,285,749 shows a dish supported off a floor by a plurality of pillars. Each pillar has a down-sloping hemispherical shaped collar, which is said to prevent the passage of ants.

U.S. Pat. No. 4,953,506 to Sanders utilizes an annular moat containing a sticky substance for trapping insects.

The Walker patent U.S. Pat. No. 5,619,952 shows an animal feeder, which utilizes a moat with a liquid or a cartridge or pad containing an insect repellent. Once again, a specially formed dish is required.

The Frank patent U.S. Pat. No. 6,065,428 shows a pet dish with an insect barrier. The barrier is a recess near the bottom of the dish and includes a surrounding strip containing an insecticide. Once again, a specially formed dish is required.

BRIEF SUMMARY OF THE INVENTION

It is an object of the present invention to provide a crawling insect repelling system which uses a plurality of feet which may be adhered to the underside of an existing dish and/or platform, such as a tray, which feet include a barrier to prevent the passage of crawling insects.

The present invention is for an ant repellent stand for affixing to and supporting a container holding an ant attracting substance, such as dog or cat food. The stand can also be used under a platform to support any insect-attracting substance. While ants are the most common crawling insect pests, the term as used herein is intended to include all crawling insects, which night infest the contents of a container. The ant repellent stand has an inverted cup with a base having an upwardly facing attachment surface. The cup has a downwardly depending peripheral side wall extending downwardly from the base and forming a cavity. The upper surface of the cavity is the underside of the base and the side walls of the cavity are the inner surface of the peripheral side walls. A support post is affixed to the base and extends downwardly past the lower edge of the downwardly depending peripheral side walls. An ant repellent ring is supported, within the cavity above the lower edge of the peripheral side wall. Alternatively, cotton or other soft, absorbent material may be pressed into the cavity and a repellant substance may be added to the material. Three or more stands may be affixed to the underside of a dish, plate, or other container holding a substance attractive to crawling insects. Alternatively, a platform may be supported which, in turn, would support a dish, plate, or other container.

An additional feature is that the device is made so that animals or children are restricted by the narrowness of the opening to prevent them from reaching the chemical.

The present invention is also for the process for preventing ants from invading the contents of a container. The process includes the steps of applying an adhesive on an upper surface of a base of a foot assembly having downwardly depending peripheral side walls, creating a cavity between an undersurface of the base and an inner surface of the downwardly depending peripheral side walls, and providing a support post extending downwardly through the cavity. The base is then pressed against the underside of the container. The pressing step is repeated at least three times to provide at least three feet held to the underside of the container. An ant repellent ring is snapped into the cavity around the support post, thereby preventing crawling insects from reaching the contents of the container.

BRIEF DESCRIPTION OF THE SEVERAL VIEWS OF THE DRAWING

FIG. 1 is a perspective view showing the top and side of the ant repellent stand of the present invention.

FIG. 2 is a perspective view showing the side and a portion of the underside of the stand of FIG. 1.

FIG. 3 is a perspective view showing the underside of the stand of FIG. 1.

FIG. 4 is a perspective view showing the underside of the stand of FIG. 1 including an ant repelling ring.

FIG. 5 is a cross-sectional view of a first embodiment of the ant stand of FIG. 1.

FIG. 6 is a cross-sectional view of an alternate embodiment of the stand of FIG. 1.

FIG. 7 is a cross-sectional side view of a dog dish held by a plurality of the stands of FIG. 1.

DETAILED DESCRIPTION OF THE INVENTION

Figure 8A:
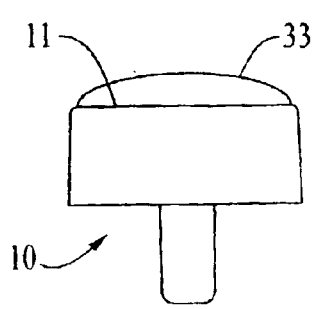
FIG. 8A is a side view of the repellent stand of FIG. 1, further including a layer of adhesive on the top.

The stand of the present invention is shown in perspective view in FIG. 1 and indicated generally by reference character 10. Stand 10 has a base 11 with an upper surface 12. An outer peripheral wall 13 extends downwardly from the outer edge of base 11 and terminates at a bottom edge 14. A support post or leg 15 extends downwardly from base 11, as shown best in FIGS. 5 and 6. The ant stand 10 would preferably be injection molded, although of course, other fabrication techniques can be used, depending upon the facilities available.

A perspective view of the ant stand 10 is shown in FIG. 2 where it can be seen that support post 15 extends upwardly past the bottom edge 14 of peripheral side wall 13. The inner surface of the side wall 16 provides the outer wall of a cavity indicated generally by reference character 17. Four protrusions 18 extend outwardly from support post 15 and are used to facilitate the securing of an ant repelling disk in cavity 17 as set forth in more detail below.

The underside 19 of base 11 is shown in FIG. 3 and a series of reinforcing ribs 20 extend radially outwardly under base 11 to strengthen base 11. It can also be seen in FIGS. 2 and 3 that protrusions 18 have an angled bottom edge 21 which facilitate the insertion of an ant repellent disk 22.

Ant repellent disk 22 is inserted by placing the disk over support post 15 as shown in FIG. 6 in phantom view. Next the disk is pushed up and over protrusions 18 facilitated by angled bottom edges 21. The top edge 23 of protrusions 18 serve as a securement point for disk 22. While four protrusions are shown, a lesser or greater number may be used. While a two-piece repellent stand is shown in FIG. 6, the stand can, of course, be injection molded in one piece as shown in FIG. 5 and indicated by reference character 40.

Support post 15 has a bottom surface 24 which rests on the ground floor or other support surface as shown in FIG. 7.

Turning now to FIG. 7, a dog dish 25 has a bowl portion 26 filled with dog food 27. A series of ant stands 10 have been adhered to the undersurface 28 of bowl portion 26. The support posts 15 rest on ground surface 29 in a way that raises the undersurface of dish 25 above ground surface 29 so that no ants or other crawling insects can crawl up the outer surface 21 of dish 25. A curved bowl portion has been deliberately shown to illustrate that it is not necessary that a dish have a flat horizontal surface for the ant repellent stands of the present invention to work. By permitting the attachment of the ant repellent stands to essentially any dish, the pet does not have to abandon the familiar feeding dish and only the repellent stands need to be purchased, rather than an entirely newly fabricated dish.

There are numerous ways of adhering the repellent stands to the underside of a dish and four of them are shown in FIG. 8. In FIG. 8A, a quantity of adhesive has been placed on base 11. If the dish to which the stand is to be affixed is particularly uneven, a viscous adhesive, such as a silicone adhesive, may be used.

Figure 8B:
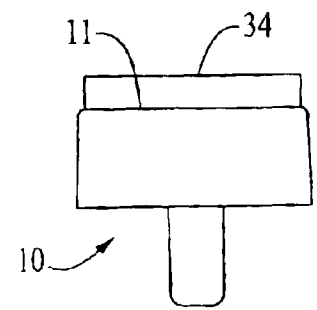
FIG. 8B is a side view of the repellent stand of FIG. 1, except using a double sided tape on the upper surface thereof.

As shown in FIG. 8B, double sided adhesive tape 34 may be used, preferably the type made from a foam which is more forgiving for use on a rough surface.

Figure 8C:
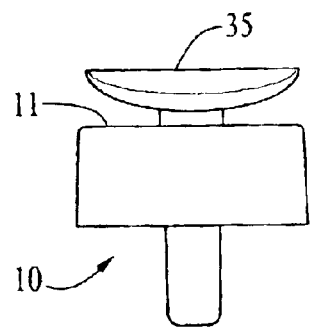
FIG. 8C is a side view of the repellent stand of FIG. 1 utilizing a suction cup on the upper surface thereof.
Figure 8D:
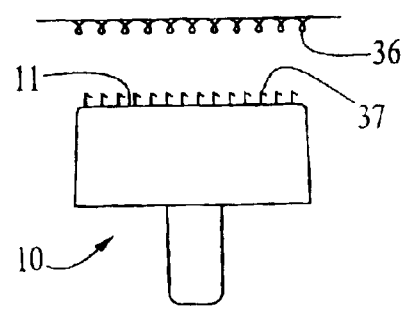
FIG. 8D is a side view of the repellent stand of FIG. 1 utilizing a hook and eye fastener on the upper surface thereof.

A suction cup 35 is shown in FIG. 8C and may be used in place of an adhesive on a suitably smooth surface. A pair of hook and eye fasteners 36 and 37 of the type commonly sold under the trademark "Velcro," are shown in FIG. 8D. These, of course, would be individually adhered, one to base 11 and the other to the underside 28 of the dish or other object.

While various means of adhering the repellent stand on the bottom of a dish are indicated in FIG. 8, it is also contemplated that the ant repellent stand could be molded as part of the original dish or platform, such as a tray, itself. This would still permit the use of the removable and replaceable ant repellent disks or other absorbent material in the cavity of the stands.

The ant repellent disk is preferably ring shaped, having an inner opening 38. It has an outer peripheral surface 39 which is preferably positioned adjacent the inner wall surface 16 to fill the cavity. Ant repellent disk 22 is preferably a foam containing any appropriate ant repellent substance. Of course, if the crawling insects which are a problem are not ants, then other repellent chemicals can be used. While disk 22 is shown held by central protrusions 18, it could be held by protrusions formed on the inner wall surface 16 along the outer edge of disk 22. Alternatively, disk 22 could be adhered to the underside of reinforcing ribs 20, if present, or just to the underside of base 11. It is advantageous, however, that the disk be easily removable for replacement of a new disk in the event the repellent becomes exhausted. By utilizing protrusions, the disk can be easily removed and a new disk installed. The repellent need not be in the shape of a disk but can be a free-form material, such as cotton. The term "sponge-like" substance as used herein is intended to include not only a sponge but also materials, such as cotton or other fibrous materials.

The result is a device which is highly versatile in use and may be placed on new dishes as well as previously owned dishes. While pet food is perhaps the largest potential for use of the present invention, it can be used for many other activities, such as on food containers used at a picnic, where ants are a classical problem, barbecues, and other typically outdoor food using activities. It can also be used indoors in areas where ants are a problem, such as food storage areas. It can be used in pantries by attachments directly on the containers or more practically, on the bottom of trays upon which the foods would be stored.

Most commonly four repellent stands would be used on the underside of a dish, although three are sufficient for many other uses and always provide a stable support. More than four stands can also be used.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An ant repellant stand for affixing to and supporting a container holding an ant attracting substance, said ant repellant stand comprising:

an inverted cup having a base having an upwardly facing attachment surface, said cup having a downwardly depending peripheral side wall extending downwardly from said base and forming a cavity having a roof comprising a downwardly facing surface of said base and said cavity having a side wall comprising the downwardly depending peripheral side wall;

a support post affixed at an upper end to said base and extending downwardly from said base, past a lower edge of said downwardly depending peripheral side wall to a lower terminus and wherein said support post has at least three extending protrusions;

an ant repelling ring surrounding said support post and said ring being recessed in said cavity and having a lower surface positioned above said lower edge of said peripheral side wall and having an inner opening which abuts said extending protrusions to hold said ring within said cavity, said ring being fabricated so that it is ant repellant; and means for securing said upwardly facing attachment surface to an underside of a container whereby a plurality of ant repellant stands may be affixed with their upwardly facing attachment surfaces affixed to the underside of said container.

2. The ant repellant stand of claim 1 wherein each of said outwardly extending protrusions has an angled lower surface angled upwardly from said post to an outer terminus to assist in the insertion of a ring over said outwardly extending protrusions thereby holding said ring in said cavity.

3. The ant repellant stand of claim 1 wherein there are four outwardly extending protrusions.

4. The ant repellant stand of claim 1 wherein said ring is fabricated from a sponge-like substance containing an ant repellant substance.

5. The ant repellant stand of claim 1 wherein said means for securing is an adhesive positioned on said upwardly facing attachment surface.

6. The ant repellant stand of claim 1 wherein said means for securing is a suction cup affixed to said upwardly facing attachment surface.

7. The ant repellant sand of claim 1 wherein said means for securing is a hook and eye attachment fabric having a hook portion affixable to one of an underside of a container and the attachment surface of said base and an eye portion affixable to the other of said underside of said container and the attachment surface of said base.

8. A process for preventing ants from invading the contents of a container comprising:

applying an adhesive on an upper surface of a base of a foot assembly having a downwardly depending peripheral side wall creating a cavity between an under surface of said base and an inner surface of said downwardly depending peripheral side wall and a support post affixed at an upper end to said base and extending downwardly through said cavity past said downwardly depending peripheral side wall to a lower terminus;

pressing said base with said adhesive against the underside of said container;

repeating said applying step and said pressing step at least three times to affix at least three foot assemblies against the underside of said container; and inserting an ant repellant ring into each cavity thereby creating a container with support feet which prevent ants from reaching the container.

9. The process of claim 8 wherein four foot assemblies are adhered to the underside of said container.

10. The process of claim 8 wherein said support post has an outwardly extending protrusion and said inserting step includes the process of expanding said ant repellant ring over said outwardly extending protrusion to secure the ring over the protrusion.

* * * * *